United States Patent

Yarrington

[15] 3,648,238

[45] Mar. 7, 1972

[54] ERROR-CORRECTING ENCODER AND DECODER FOR ASYMMETRIC BINARY DATA CHANNELS

[72] Inventor: Alfred R. Yarrington, San Jose, Calif.

[73] Assignee: Precision Instrument Company, Palo Alto, Calif.

[22] Filed: May 15, 1970

[21] Appl. No.: 37,551

[52] U.S. Cl. ....................................340/146.1, 340/173 LT

[51] Int. Cl. ....................................G08c 25/00

[58] Field of Search ....................340/146.1, 173 LT; 250/199; 346/108

[56] References Cited

UNITED STATES PATENTS

| | | | |
|---|---|---|---|
| 3,051,784 | 8/1962 | Neumann | 340/146.1 X |
| 2,512,038 | 6/1950 | Potts | 340/146.1 X |
| 3,335,409 | 8/1967 | Heller et al. | 340/146.1 X |
| 3,471,830 | 10/1969 | McRae et al | 340/146.1 |
| 3,411,135 | 11/1968 | Watts | 340/146.1 |
| 3,314,075 | 4/1967 | Becker et al | 346/108 |
| 3,365,706 | 1/1968 | King | 340/173 |
| 3,216,004 | 11/1965 | Herriott | 346/108 X |

*Primary Examiner*—Charles E. Atkinson
*Attorney*—Townsend and Townsend

[57] ABSTRACT

An encoding and decoding system for detecting and correcting error bursts of nonindependent multiple errors in asymmetric binary data channels. A message group is encoded by a burst error correcting cyclic code to form a code group consisting of message bits and check bits, the check bits being the remainder after division of the message bits by the cyclic code. The code group is complemented and the code group and its complement transferred to the asymmetric binary data bit channels. Upon retrieval, a bit-by-bit comparison of corresponding bits of the code group and its complement is used to detect an error in the retrieved data. The burst error pattern is compared with respective error syndromes in error cosets generated by division of the retrieved code group and its complement by the cyclic code group and its complement by the cyclic code to determine whether the error burst occurred in the code group or its complement. Correction of erroneous bits is made as the code group and its complement are shifted out.

13 Claims, 6 Drawing Figures

INVENTOR.
ALFRED R. YARRINGTON

BY
Townsend and Townsend
ATTORNEYS

INVENTOR.
ALFRED R. YARRINGTON
BY
Townsend and Townsend
ATTORNEYS

INVENTOR
ALFRED R. YARRINGTON
BY
Townsend and Townsend
ATTORNEYS

ERROR-CORRECTING ENCODER AND DECODER FOR ASYMMETRIC BINARY DATA CHANNELS

This invention relates to a new and improved system for encoding and decoding digital data transmitted or stored in asymmetric binary data channels, in order to detect and correct error bursts, i.e., clusters of nonindependent multiple errors, and is particularly applicable for use in laser recording systems.

A variety of error detecting and correcting codes known as cyclic codes have been developed for use in symmetric binary data channels, i.e., binary data channels, in which the probability of occurrence of an error in a "1" bit is approximately equal to the probability of occurrence of an error in a "0" bit within the binary data channel. According to these cyclic code techniques, only certain defined "code groups" are permitted for transmission through or storage within the data channel. An allowable code group consists of a string of message bits to which additional bits are annexed so that the entire string is evenly divisible by a binary cyclic code shorter in length than the code group. Thus, all the code groups transmitted through or stored in the data channel are evenly divisible by a preselected cyclic code. Upon retrieval each code group is divided by the cyclic code and the occurrence of a remainder indicates the existence of an error in the retrieved data code group.

Encoding by cyclic code proceeds as follows. A string of message bits of predetermined length referred to herein as a "-message group" is divided by the cyclic code which also consists of a string of binary bits. Long division is effected by first annexing to the end of the message group a string of zeros in number equal to the number of places in the cyclic code. The cyclic code or "generator group" is divided into the message group and annexed zeros by long division using binary arithmetic modulus 2. The remainder of the long division is then subtracted from the message group and annexed zeros. In other words, the remainder replaces the annexed zeros. Because in binary arithmetic subtraction and addition are equivalent, the result is a string of digits referred to herein as the "code group" consisting of the message group and remainder bits annexed to it. The resulting code group is evenly divisible by the generator group and is therefore allowable for transmission through or storage in binary data channel.

Upon recovery of the code group, it is divided by the cyclic code generator group to determine the existence of occurrence of an error in the retrieved data. If the division leaves no remainder, the code group is presumed to be error-free. If a remainder occurs, however, the occurrence of an error in the retrieved data has been detected. The cyclic codes are particularly suitable for detecting the occurrence of burst errors, i.e., multiple nonindependent errors in clusters equal in length to or shorter than the remainder developed by division of the code group by the generator group. A weakness of the cyclic code technique, however, is that the particular pattern of the error burst cannot be determined with certainty for purposes of error correction.

Long division of the retrieved code group containing erroneous binary bits by the generator cyclic code produces a first remainder indicative of the presence of the erroneous bits. As the long division processes continue, a series of remainders are generated, each remainder indicating a possible error pattern or error syndrome in the recovered code group. Eventually, the long division produces a remainder or error syndrome identical with the first remainder and a cyclic pattern is repeated thereafter. The set of remainders or error syndromes in the cycle is referred to as an error coset and the ambiguity of the cyclic code technique arises because the decoding procedure is capable only of determining the error coset in which the detected error burst occurred. The traditional cyclic encoding and decoding method are incapable of identifying the particular error syndrome in the error coset corresponding to the detected error burst in the retrieved data. As a result, an estimate or guess must be made as to which of the error syndromes in the coset most probably occurred and correction of the recovered bit proceeds according to the most likely syndrome.

Long division of the retrieved code group by the generator cyclic code not only provides a means for detecting the occurrence of an error in the group, however, but also potentially provides information as to the exact pattern or syndrome of the clustered multiple errors in the detected error burst. Thus, the successive remainders generated by long division indicate the possible error patterns in the detected burst. The successive remainders are referred to herein as error syndromes. Eventually, the long division repeats itself by generating a remainder equivalent to the first remainder and the set of error syndromes in a single cycle is referred to herein as the error coset. The ambiguity of the cyclic error detecting codes resides in the inability to identify the error syndrome in the coset which corresponds to the detected error burst. The result upon decoding an erroneous message is ambiguous in that the cyclic code merely determines the coset to which the error pattern belongs and cannot, by itself, determine which specific syndrome within the coset is the actual error pattern in the retrieved data. As a result, an assumption is usually made that one of the particular syndromes known as the "-coset leader" namely, the most likely error syndrome, is the actual error pattern in the retrieved data.

It is an object of the present invention to provide a new and improved system for encoding and decoding binary digital data for transmission through and storage in binary data channels capable of identifying the occurrence of burst errors in the transmitted or stored data, and also capable of identifying the specific error pattern or error syndrome for correction of the erroneous data.

Another object of the present invention is to provide a data encoding and decoding system for asymmetric binary data channels which uses the asymmetry in the occurrence of errors to resolve ambiguity in the identification and correction of burst errors.

In order to accomplish these results, the present invention contemplates providing an error correction and detection system for asymmetric binary data channels, i.e., binary data channels in which the probability of occurrence of an error in one type of bit is substantially smaller than the likelihood of occurrence of an error in the other type of bit. An example of such an asymmetric binary data channel is the laser recording system. Such laser recording systems are described by way of example in U.S. Pat. application Ser. Nos. 807,548; 807,551; 807,553; 831,172, and U.S. Pat. No. 3,474,457, and provide for storage of binary data by ablation or vaporization of bits in an energy-absorbing reflective medium such as a thin metallic layer formed of a substrate. Thus, an ablated element in the surface which destroys the reflectivity can designate a "0" bit, while an unaffected reflective element can designate a "1" bit. Later retrieval of the stored data is accomplished by illuminating the data tracks and sensing variations in the reflected light from the recording surface. As a result of this physical storage arrangement that a nonreflective "0" bit region of the surface may be erroneously read as a reflective "1" bit region is substantially zero. On the other hand, there is a real probability that a "1" bit may be read as a "0" bit because of dirt particles on the recording surface or defects in the recording medium layer. Furthermore, dirt particles and recording medium defects tend to produce short groups or clusters of nonindependent errors referred to herein as error bursts. Thus, the present invention is particularly directed to asymmetric data channels in which the errors tend to occur in short bursts rather than as random isolated single bit errors.

According to the invention, a message group of binary data bits is encoded by means of a burst error cyclic code of the known type such as that heretofore described and such as that set forth in the following references: Peterson and Brown "-Cyclic Codes for Error Detection," Proceedings IRE, Vol. 49, No. 1, January 1961, pages 228–235; W. W. Peterson, *Error Correcting Codes*, MIT Press, 1961. The resulting code group is complemented and the code group and its complement are transmitted through or stored within the binary data channel. Upon retrieval of the data, a comparison of the code group and its complement is carried out bit by bit in order to determine the existence of an error burst and the location of the initial bit in the burst.

In order to determine in which data group the error occurred, namely, the code group or its complement, reference is made to the respective cyclic error syndromes of the code group and its complement generated by division of the code group and its complement by the generating cyclic code. Thus, the retrieved code group and its complement are divided by the generating cyclic code to determine the error coset and specific error syndromes corresponding to the detected error. The succeeding pattern of bits in the code group and its complement following the initial bit in a detected error burst are compared with the respective error syndromes generated by the cyclic code division. Coincidence of the error pattern determined by the bit-by-bit comparison of the code group and its complement with one of the two error syndromes generated respectively for the code group and its complement indicates where the error burst occurred, namely, in the code group or the complemented code group. The erroneous bits are corrected according to the pattern in the coincident syndrome as the bits of the code group and its complement are shifted out.

Thus, the invention generally contemplates utilizing the error asymmetry in asymmetric binary data channels for identifying the occurrence of an error and the pattern of the error burst. This is accomplished by recording a code group and its complement. Because the data channel can only erroneously transform zeros to ones, for example, then a recorded 1 bit will never erroneously read as a 0 bit, while the recorded zero bit may ultimately erroneously read as a 1 bit. In view of this, a read 0 bit is by definition correct, while a read 1 bit is subject to doubt. This asymmetry is used to advantage in the present invention by originally recording all of the data for transmitting in zeros, a condition satisfied by recording or transmitting the data code group in both its true and its complemented form. Upon retrieval, a bit-by-bit comparison of the true and complemented forms of the data code group indicate the existence of an error and the pattern of the burst. Thus, if the bits disagree, the expected result, the information is correct and error-free. However, if both bits are the same, one function is in error but not both. This is because in the examples referred to above, both bits are 1 in the event of an error and both bits equal to 0 is not a possible result in the data channel. Comparison of subsequent bits provide the error pattern in the error burst but cannot determine whether or not the error burst occurred in the true code group or its complemented form.

Determination of whether or not the detected error pattern occurred in the code group, is accomplished by referring back to the cyclic code. Thus, both the retrieved true code group and its complement are divided by the generating cyclic code to subsequently display each of the possible syndromes in synchronism with the starting error bit position. Comparison of the detected error pattern in the retrieved data with the respective error syndromes for the code group and its complement provide the basis for identifying in which code group, namely, the true code group or its complement, the error burst occurred. As the code group and its complement are shifted out from respective registers, erroneous bits determined to be in the code group are complemented according to the pattern of the coincident error syndrome generated by the cyclic code. According to other aspects of the invention, techniques are provided for detecting and correcting burst errors having lengths in excess of the remainder error syndromes generated by the cyclic code. Furthermore, techniques are provided for dealing with simultaneous error bursts in the code group and its complement within the data channel.

Other objects, features and advantages of the present invention will become apparent in the following specification and accompanying drawings.

Figure 1:
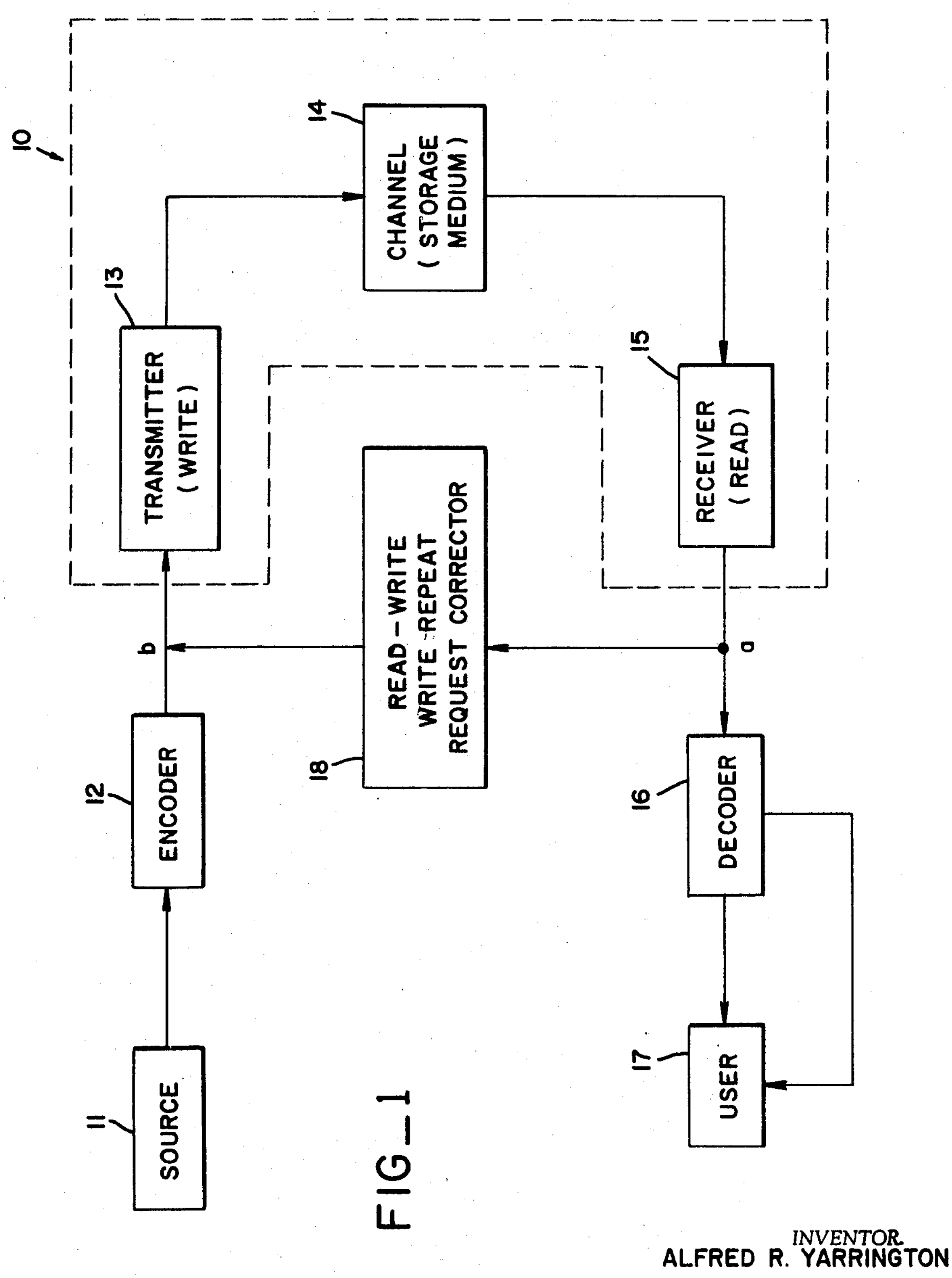
FIG. 1 is a block diagram of a laser recording unit high-density storage and retrieval system incorporating the present invention.

A block diagram of binary data channel of the forward error correcting type for data storage and transmission is shown in FIG. 1 with particular reference to a laser recording system of the type described in U.S. Pat. application Ser. Nos. 807,548; 807,551; 807,553; and 831,172, referred to above. Information bits from a source 11 are encoded sensing appropriate error check parity bits by encoder 12 which also arranges the data format for transmission of the data bits through binary data channel 10. In the laser recording system data channel the transmitter or data write component 13 consists of a laser whose output is intensity modulated for selectively ablating or vaporizing diffraction limited bits in the micron size range from an energy-absorbing reflective metallic layer which forms the channel storage medium 14. The stored data is retrieved by reflective or transmissive readout of the ablated data tracks in the storage medium using an appropriate light source and sensing elements forming the receiver or data read component 15 of the data channel 10. The received data is processed by a decoder to check the error status of the retrieved data and correct the data to be error-free, or to indicate information bits containing detected but uncorrected errors. The decoder 16 also restores the original format of the information bits for use by a user 17. The laser recording unit is also provided with a subsidiary data channel 18 more fully described in the patent applications referred to above which is operative during the time that the writing laser 13 is ablating or burning data tracks in the storage medium. The subsidiary data channel provides a read-while-write capability for detecting errors during laser scribing and for providing real time flagging or marking of defective data described in the storage medium immediately during the writing process.

Figure 2A:
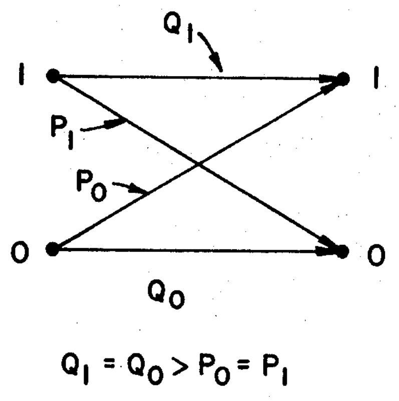
FIGS. 2A and 2B are diagrammatic representations of binary symmetric and binary asymmetric data channels, respectively.

The laser recording unit approximates a binary asymmetric data channel distinguished from a symmetric channel schematically represented in FIG. 2A. As shown in that diagram, the probability $P_1$ of a 1 bit erroneously occurring as an 0 bit in the data channel is equal to the probability $P_0$ of a 0 bit appearing erroneously as a 1 bit in the data channel. Similarly, the probabilities $Q_1$ and $Q_0$ of the 1 bit and 0 bit, respectively, occurring error-free are also equal and greater than the probability of occurring erroneously.

Figure 2B:
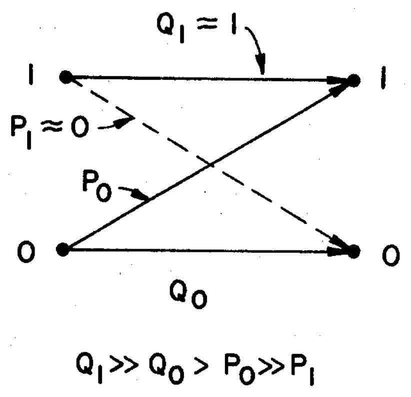

An asymmetric binary channel which the laser recording unit approximates is shown in the schematic diagram of FIG. 2B. If a reflective element of the storage medium is considered to be a 0 bit and an element in which the reflectivity has been destroyed is considered to be a 1 bit, the probability $P_0$ of the 0 bit occurring as a 1 bit is substantially greater than the probability $P_1$ of a 1 bit occurring as a 0 bit in the storage channel. In fact, the probability $P_1$ that a recorded 1 bit will occur erroneously as a 0 bit is essentially zero. Thus, the probability $Q_1$ that a recorded 1 bit in the data storage channel will appear error-free is essentially 1 and substantially greater than the probability $Q_0$ that a recorded 0 bit will occur error-free because there is a substantial probability that a recorded 0 bit may appear as a 1 bit because of dirt or defects on the recording medium surface.

It is this asymmetry in the probability of error occurrence in the laser recording system which is utilized in the present invention in combination with cyclic error detecting codes for providing highly efficient error correction and detection of burst errors or multiple nonindependent clusters of error produced by storage medium defects and artifacts on the storage medium surface.

Figure 3:
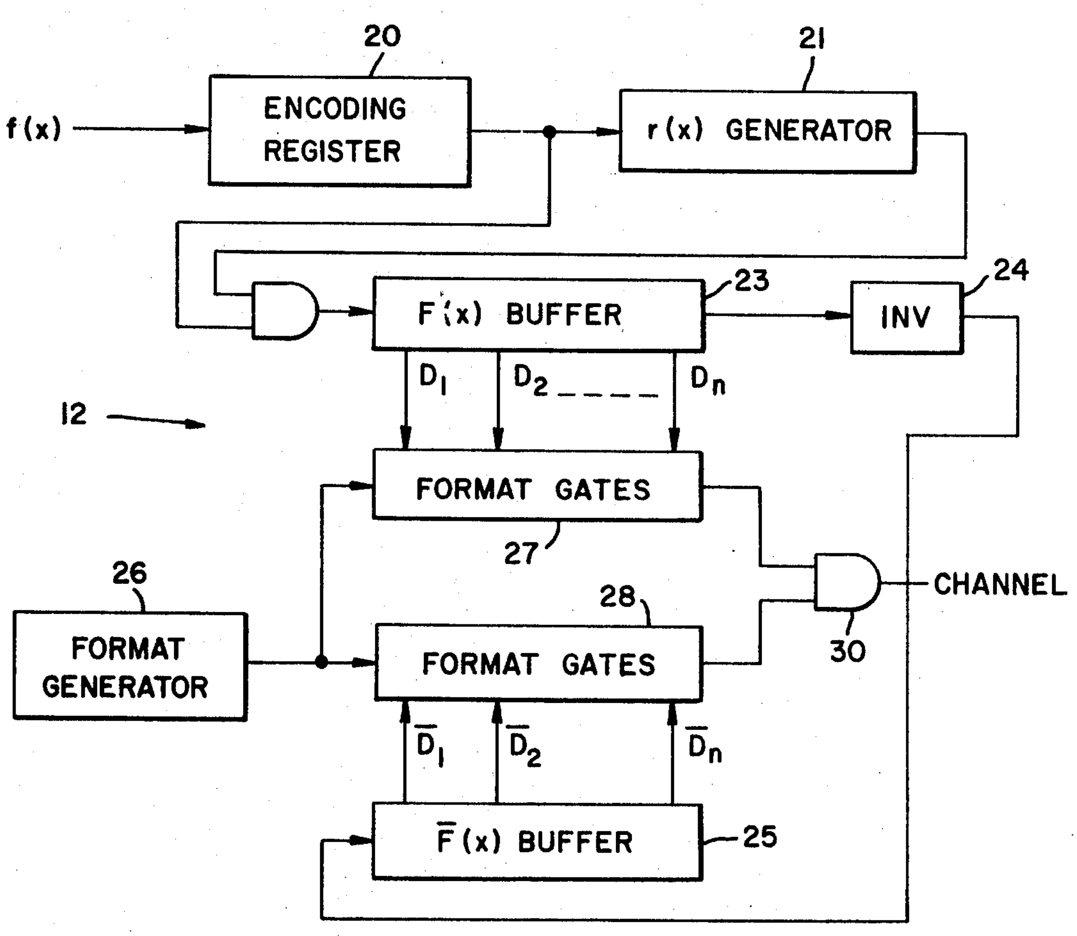
FIG. 3 is a block diagram of the encoder.

An encoder 12 for accomplishing this aspect of the invention is set forth in more detail in FIG. 3. As shown in this block diagram which also represents a flow chart of the basic encoding algorithm, a string of source information bits $f(x)$ is received by the encoding register 20. A string of binary bits can be conveniently represented as a coefficient of a polynomial in the dummy variable $x$. Thus, the power of $x$ for a particular term in the polynomial represents the binary place position in the binary string and a term in the polynomial exists for each power of $x$ for which a coefficient 1 occurs in the corresponding place in the binary bit string, while no terms in the polynomial are present for those powers of $x$ representing places in the binary string occupied by coefficient zeros. For example, a message string of data bits 110101 can be represented by the polynomial $1+x+x^3+x^5$ where the polynomial is written from low order to high order according to the convention whereby signal flow occurs from left to right. The source information polynomial $f(x)$ is thereafter processed by remainder generator 21 which is a conventional cyclic code generator. Thus, the generator 21 annexes to the source data $f(x)$ a number of zeros equal to the degree of the selected cyclic code generator polynomial $g(x)$ which is also a binary bit string. This is accomplished using the polynomial convention by multiplying $f(x)$ by a single polynomial ter of $x$ to a power equal to the degree of the generator polynomial $g(x)$. The source data polynomial with its appended zeros is then divided by the generator polynomial $g(x)$ of the cyclic code to provide a remainder polynomial $r(x)$. The generated remainder $r(x)$ has a degree less than the degree of the generator polynomial $g(x)$ so that the binary bits of the remainder can replace the zeros appended to the source data polynomial. This is accomplished by adding or subtracting the remainder with the augmented data source polynomial by means of the logic gate 22 which performs the arithmetic process of either adding or subtracting the two polynomials in the modulus 2 arithmetic in which subtraction and addition are equivalent.

The resulting combination referred to herein as the data block polynomial $F(x)$ and is given by the following equation where $m$ is the degree of the cyclic code polynomial:

$$F(x)=x^m f(x)-r(x).$$

The highest order coefficients of the data block polynomial $F(x)$ are therefore the same as the coefficients of the source data string $f(x)$ while the lower-order $m$ coefficients of the data block polynomial $F(x)$ are the coefficients of the remainder $r(x)$, the latter coefficients comprising the check bits of the data block.

The data block polynomial $F(x)$ is stored in buffer storage 23 and the 1's complement of the data block, namely, $\overline{F}(x)$ is formed by inverter 24 and stored in buffer storage 25. The data block and its complement are then formatted by format generator 26 and format gates 27 and 28. The formatting can consist, for example, of dividing the data block $F(x)$ into subblocks $D_1, D_2, \ldots D_n$, each $r$ bits in length, where $r$ is the length in bits of the remainder $r(x)$. The same formatting is accomplished for the data block complement $\overline{F}(x)$ providing subblocks $\overline{D}_1, \overline{D}_2 \ldots \overline{D}$. As is hereinafter described, the subblocks are interleaved and this formatting arrangement permits the resolution of a single error burst of two $r$-bit lengths into two single bursts of $r$ bits each, one in the data block $F(x)$ and the other in the data block complement $\overline{F}(x)$ during the decoding process. Each of the single bursts of $r$ bits each is correctable whereas the single error burst of two $r$ bits in length would otherwise not be correctable because the cyclic code is limited to detection and correction of error burst of length $r$ or less. The formatted data block and its complement are thereafter gated through logic gate 30 to the binary data channel for transmission or recording.

The arithmetic portions of the encoder 12 such as, for example, the remainder generator 21, can be formed by a series of appropriate feedback shift registers of the type described in Chapter 7 of Peterson Error Correcting Codes, referred to earlier.

Figure 4:
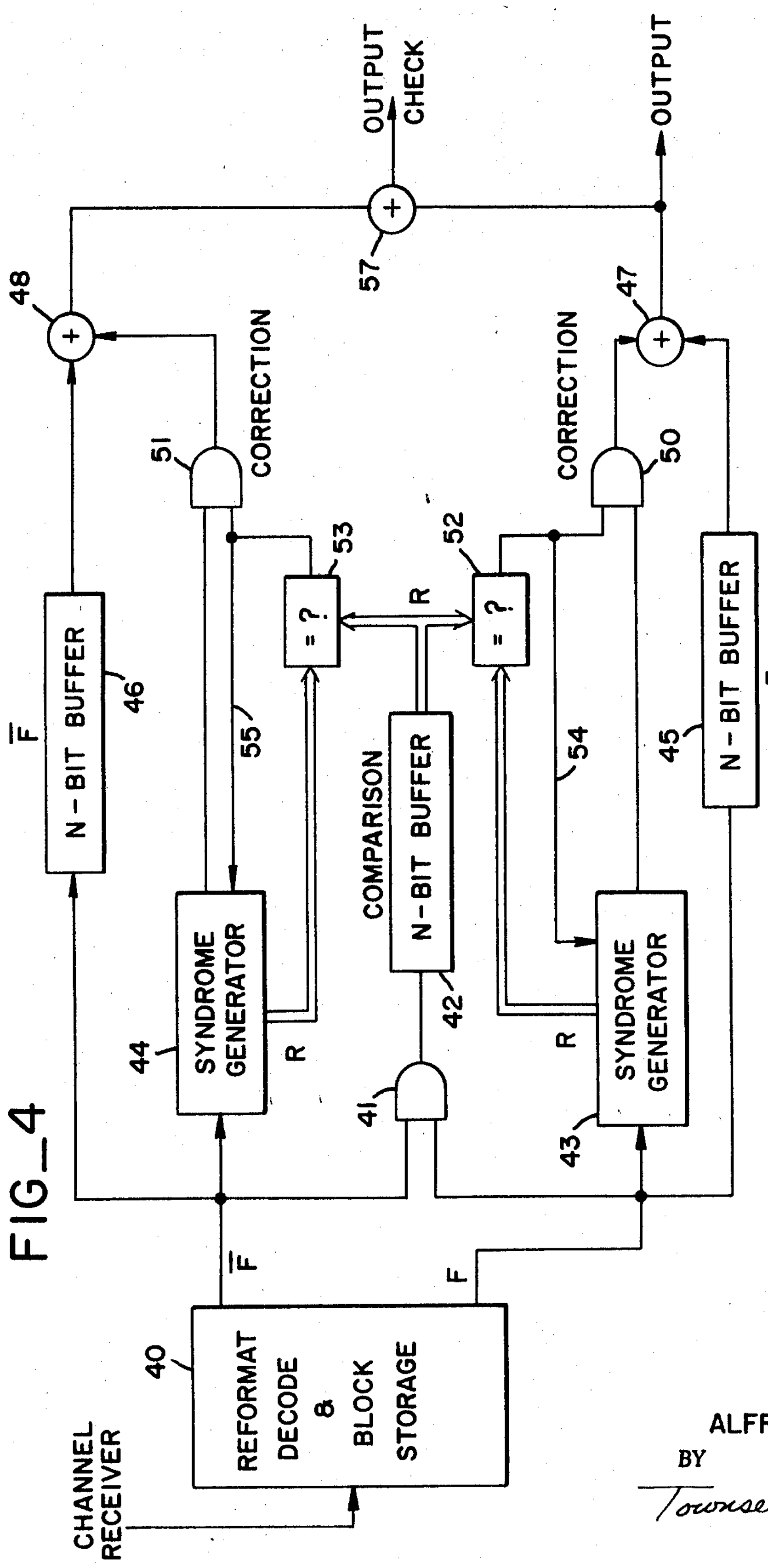
FIG. 4 is a block diagram of the decoder.

In the laser recording system, the encoded data, namely, the data block, $F(x)$ and its complement $\overline{F}(x)$ are used for intensity modulating a laser beam for burning or scribing data tracks in the form of diffraction limited bits in the micron-size range. Upon retrieval of the stored data block and its complement by, for example, reflective or transmissive readout of the ablated data tracks, the data is reformatted into the blocks of the original length of $F(x)$ and $\overline{F}(x)$ and temporarily stored in the reformat and decode block storage unit 40 as shown in block diagram of the decoder unit 16 in FIG. 4. From buffer storage in block 40 the reformatted data block $F(x)$ and its complement $\overline{F}(x)$ are fed to a logic gate 41 for bit-by-bit comparison of the respective bits comprising the data block and its complement. If the respective bits are of opposite value, namely, zero and one, the expected result, it is assumed that no error has occurred and a 0 bit is transferred to the N-bit buffer storage block 42, where N is the length in bits of the data block. If respective bits of the data block and its complement have the same value, namely, one, it is assumed that an error has occurred and a "L" bit is transferred into the N- bit buffer storage 42 in the same position as the pair of similar bits indicative of an error. The result in the N- bit storage buffer 42 is a string of data bits in length equal to the data block and having a pattern corresponding to the pattern of any error burst which may have occurred within the data block or its complement during recording, transmission, or storage.

At the same time the data block F and its complement $\overline{F}$ are directed from the reformatting block and buffer storage 40 to syndrome generators 43 and 44 which respectively compute the remainders for the data block F and its complement $\overline{F}$ upon division by the cyclic code generator $g(x)$.

If no error occurred in either the data block or its complement, then the bit-by-bit comparison through logic 41 will generate a string of zeros in the N- bit buffer storage 42 and the syndrome generators 43 and 44 will generate zero remainders. In that event, the data block and its complement which have also simultaneously been stored in the buffer storage blocks 45 and 46 are shifted out of the decoder without change. If an error burst occurred in only one of the functions, namely, the data block, or its complement, but not both, then the bit-by-bit comparison through logic gate 41 generates for storage in the N- bit buffer block 42 a string of bits including a pattern corresponding to the error burst which occurred in either in either of the data block or its complement. At the same time one of the syndrome generators 43 or 44 will generate a string of zeros for the remainder in the function in which no error occurred, while the other syndrome generator will produce a remainder indicative of the occurrence of an error in that function. Since the bit-by-bit comparison performed by logic gate 41 provides in the N- bit buffer storage 42 the pattern of the error burst which occurred and the syndrome generator 43 and 44 indicate in which function, namely, the data block or its complement, the error occurred, the data block F and its complement $\overline{F}$ can be shifted out of the buffers 45 and 46 and the erroneous bits complemented by one of the logic elements 47 and 48 under control of gates 50 and 51. Thus, the N-bit comparison string in buffer 42 provides the error syndrome and syndrome generators 43 and 44 indicate in which function the error burst occurred. The N-bit comparison string in buffer 42 and the data block and its complement in buffers 45 and 46 are shifted out until a 1 bit is encountered in the comparison string 42 indicating the bit place or location of the initial erroneous bit of an error burst. The erroneous bits of the function in which the error burst occurred are thereafter complemented according to the error burst pattern indicated by the comparison string as the respective bits are shifted out of the buffers.

If error bursts occur in both the data block and its complement but are nonoverlapping, both syndrome generators 43 and 44 will actively generate remainders constituting the cyclic error syndromes of an error coset. In this situation, the bit-by-bit comparison logic gate 41 provides an N-bit comparison string indicating the pattern of the successive error burst in the data block and its complement. However, it does not indicate in which of the two functions, namely, the data block or its complement, the successive error burst occurs because remainders are generated by both the syndrome generators 43 and 44 indicative of the occurrence of error bursts in both functions. As shown in the block diagram, provision is made by means of logic circuitry for comparison of the generated remainders with a corresponding number of bits in the comparison bit string in buffer 42. If a 1 bit occurs at the leading bit of the comparison string indicating the initial erroneous bit in an error burst, the first *r* bits in the N-bit strong are compared with the respective remainders generated by syndrome generators 43 and 44. The indicated error pattern in the first *r* bits of the N-bit comparison string 42 are matched with one of the error syndromes, the match indicating in which function the error burst occurred. If the match is found, the respective syndrome generators are disabled by a feedback loop 54 or 55 and the first *r* bits of the data block and its complement buffers 45 and 46 are shifted out along with the first *r* bits of the N-bit comparison string 42. As the *r* bits are shifted out, the bits in the erroneous function are complemented according to the error pattern in the matched error syndrome. Complementing is accomplished by modulus 2 binary adders indicated by the circle pulses 47 and 48. If no match occurs between the first *r* bits of the N-bit comparison string in buffer 42 beginning with the one bit, with either of the syndromes generated by generators 43 and 44, then the error is uncorrectable.

If a 1 bit does not occur at the leading edge of the comparison bit string in buffer 42, then the first bits in the data block and its complement are correct. These are shifted out without change as is the first bit in the comparison string, and the syndrome generators are actuated to display the second remainder or syndrome in the corresponding error cosets. It is recalled that long division of the data block and its complement produces cyclic patterns of remainders referred to as error syndromes, a cycle of remainders comprising an error syndrome. If a 1 bit now occurs in the second bit of the comparison string, the comparison and correction procedure described above is carried out while if the bit is again 0, indicating that the second bits are correct, the second bits are shifted out and the third syndrome in the error coset displayed. This process is continued until the entire data block and its complement are shifted out. A final output check can be accomplished by again adding the data block and its complement at gate 57 for a final comparison of coincidence between the data block and its complement.

Because the decoding algorithm utilizes the error cosets of error syndromes generated by long division of the data block and its complement, the algorithm fails if more than one error burst occurs in the data block or its complement. Furthermore, if a single error burst occurs in each function of the error burst overlap, then the comparison will no longer provide a pattern corresponding to a single error syndrome and a more complicated procedure must be followed. The problem of overlapping error bursts can be negotiated by a "syndrome look ahead" technique whereby a ($2r-1$) bit comparison is matched with a current syndrome plus one of $r-1$ future syndromes from the other coset. In other words, the comparison bit string is matched with the current syndrome of one function and one of the $r-1$ future syndromes of the other function. A considerably more complex decoding algorithm is required.

A simple alternative for handling the problem of overlapping error bursts in the data block and its complement is to record the data block in subblocks of *r* bits each as heretofore described with reference to the encoder of FIG. 3. According to one example, the data block is recorded as follows:

$$D1\ \overline{D}_{n-1}\ D_2\ \overline{D}_n\ D_3\ \overline{D}_1 \ldots D_{n-1}\ \overline{D}_{n-3}\ D_n\ \overline{D}_{n-2}$$

By means of this format, a single error burst of two *r* bits in length will resolve itself into two single bursts of *r* bits each, one in the data block F and the other in its complement $\overline{F}$ without overlap. A cyclic code generator $g(x)$ having a degree *r* (which generates an *r* bit remainder) is sufficient to correct each data block using this subblock format.

A particular example of the algorithm for decoding, comparing, and correcting a data block retrieved from storage in a binary asymmetric data channel is set forth with reference to Table 1. In this example, the original data block generated by annexing to the information bits a string of zeros in number equal to the degree of the cyclic code generator polynomial, dividing the information bits and annexed zeros by the cyclic code generator, and subtracting the resultant remainder from the information bit string and annexed zeros (the remainder replaces the zeros) is equal to: 100010011110. The data block and its complement are stored in the asymmetric binary data channel consisting of, for example, a laser recording unit. Upon transmission and storage, however, errors occur in the tenth, seventh and sixth bits of the data block and in the fourth and third bits of the data block complement as shown in Table 1, places being read from right to left. Upon retrieval of the data block and its complement, the N-bit buffer 42 and syndrome generators 43 and 44 of the decoder illustrated in FIG. 4 respectively sequentially display the results of bit-by-bit comparison of the data block and its complement and the error syndromes for the data block and its complement represented in the three columns of Table 1. The cyclic code generator polynomial (not shown in the Table) has generated six place remainders, i.e., remainder polynomials of degree 5, the degree being one less than the number of places. For this reason the number of comparison bits viewed at one time is also selected to be six, the maximum length of a detectable error burst in the data block or its complement.

TABLE 1

Original data block=1 0 0 0 1 0 0 1 1 1 1 0
$F$=1 0 1 0 1 1 1 1 1 1 1 0 (10th, 7th, & 6th bits in error)
$\overline{F}$=0 1 1 1 0 1 1 0 1 1 0 1 (4th, & 3rd bits in error)
The following will occur (where 1=bit error)

| | Comparison F, $\overline{F}$ | F Syndrome | $\overline{F}$ Syndrome |
|---|---|---|---|
| Initial | 1 0 0 1 0 0 | 0 1 0 0 1 1 | 1 0 0 0 0 1 |
| Shift: | | | |
| 1 | 1 1 0 0 1 0 | 1 1 0 0 1 0 | 1 0 1 0 1 1 |
| 2 | 0 1 1 0 0 1 | 0 1 1 0 0 1 | 1 0 1 1 1 0 |
| | ←match→ | | |
| 3 | 1 0 1 1 0 0 | 0 0 1 1 0 0 | 0 1 0 1 1 1 |
| 4 | 1 1 0 1 1 0 | 0 0 0 1 1 0 | 1 1 0 0 0 0 |
| 5 | 0 1 1 0 1 1 | 0 0 0 0 1 1 | 0 1 1 0 0 0 |
| 6 | 0 0 1 1 0 1 | 0 0 0 0 0 1 | 0 0 1 1 0 0 |
| 7 | - 0 0 1 1 0 | 0 0 0 0 0 0 | 0 0 0 1 1 0 |
| 8 | - - 0 0 1 1 | 0 0 0 0 0 0 | 0 0 0 0 1 1 |
| | ←match→ | | |
| 9 | - - - 0 0 1 | 0 0 0 0 0 0 | 0 0 0 0 0 1 |
| 10 | - - - - 0 0 | 0 0 0 0 0 0 | 0 0 0 0 0 0 |
| 11 | - - - - - 0 | 0 0 0 0 0 0 | 0 0 0 0 0 0 |
| 12 | - - - - - - | 0 0 0 0 0 0 | 0 0 0 0 0 0 |

Referring to the first line of the first column, the string of bits from right to left indicates the results for the comparison of the first respective six bits of the data block and its complement, a zero indicating no error in the bit pair and a one indicating the occurrence of an error because of coincident ones in the data block and its complement. The comparison bits in Column 1 are read from right to left and indicate the results of bit-by-bit comparison of the data block and its complement going from left to right, namely, from the coefficients of higher order terms in the polynomial to coefficients of lower order terms in the polynomial. Thus, the first or initial row of bits reading from right to left in Table 1 is 001001 indicating the occurrence of errors at the 10th and seventh bit positions for the 12-place data block and data block complement. At the same time the syndrome generators generate the first error syndrome of the error coset for the data block and its complement in the second and third columns, respectively. Because the first data bit in the comparison bit string is zero, the first pair of bits at the left end or higher order end (in the 12th place) of the data block and complement are correct and are shifted out. At the same time the comparison bit string also shifts to the left giving the results of comparison of the 11th through sixth bit pairs. The syndrome generators likewise generate the second error syndrome or remainder in the error coset for the data block and complement, respectively, resulting from long division by the cyclic code generator polynomial. After this shift, the leading bit of the comparison bit string is again zero indicating that the second comparison bit pair, in the 11th place, is error free. The second pair of comparison bits are therefore shifted out. The comparison bit string is shifted one place further and the third error syndrome in the error coset displayed shown in the third line of the three columns of Table 1. After this shift, the initial bit in the comparison bit string is a one, indicating the initial error in an error burst. In this example the error burst spans by bits the tenth through fifth place bits, the error burst pattern reading from right to left in the comparison string of Table 1 being 10011. When a 1 bit appears at the rightmost bit of the comparison string as in the third line of Column 1, one of the two syndrome generators must supply a matching error pattern which indicates in which function, namely, the data block or its complement, the error burst occurred. The syndrome generator for the data block F shown in Column 2 provides a match with the error pattern of the error string displayed in Column 1, indicating that the error burst occurred in the data block F. The error pattern matched by the F syndrome generator shows that bits 10, seven and six are in error. This six-bit data string of the data block is then shifted out and corrected according to this pattern, namely, by complementing the 10th seventh and sixth bits under control of the matching pattern of the F syndrome generator. The F syndrome generator also shuts off. As the six shifts continue during correction of the data block, the syndrome generators, including the data block complement generator, are stepping through the respective cosets. After correction of the data block F is completed, the syndrome generator for the data block complement $\overline{F}$ becomes the sole source for matching a subsequent error pattern indicated by the comparison bits in Column 1. After the eighth shift, a 1 bit again appears at the right or leading edge of the comparison bit string indicating the initial error in an error burst. Because the F syndrome generator is shut down, only the syndrome generator for the data block complement $\overline{F}$ displays an error syndrome which in fact matches the error pattern displayed by the comparison bits in Column 1 indicating the occurrence of an error burst in the data block complement. As the data block and its complement are shifted out, the data block complement is corrected according to the pattern displayed by the matching $\overline{F}$ syndrome generator, namely, by complementing the fourth and third bits. After this correction, both syndrome generators are empty and the comparison bit suffer storage should remain empty for the concluding bits. After this process, the data block F and its complement $\overline{F}$ should be completely complementary indicating that all errors have been corrected. A final comparison of the corrected data block and its complement can be performed by the decoder by means of modulus 2 adder 54 and if further errors are indicated, the additional error burst cannot be corrected under the limitations of the described example.

As a general rule, an error detection cyclic code is capable of dealing with error bursts having a length equal to the degree of the cyclic code generating polynomial, i.e., having a number of places equal to one less than the number of places of the cyclic code generator polynomial which is also the length of the remainder error syndromes. The length of the burst error is defined as the number of bits between the first and last errors including these errors. However, other specialized formulations of the cyclic codes are available for handling certain patterns of error of greater length. These are set forth in the references cited above.

Figure 5:
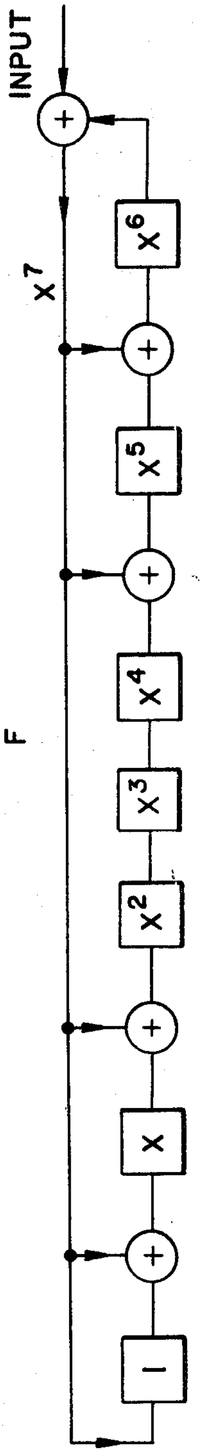
FIG. 5 is a block diagram of a shift register feedback network for binary long division.

Long division of the data blocks by the cyclic code generator polynomial in binary arithmetic modulus 2 can be carried out using shift register networks of the type illustrated in FIG. 5. The shift register network shown in that figure divides in binary arithmetic modulus 2 by the polynomial $X^7+X^6+X^5+X^2+X_1$ — which represents the binary string 11100111. The blocks represent memory elements, i.e., flip-flops and the + symbol represents a modulus 2 adder or subtractor also equivalent to an exclusive OR gate in binary arithmetic. Whenever a 1 appears on the feedback line the polynomial is subtracted from the register contents. The input polynomial is entered at the most significant bit position, which effectively multiplies the input by $X^7$ a necessary operation for the coding. The quotient, $X^7$, shifts off the end of the register with each input. The remainder is the residue of the operation, the contents of the shift register after K inputs. The sequence of the operation is shown in Table 2 with the quotient $f(x)$= 11001010 appearing in the left column of the register table and the remainder appearing at the bottom row of the table. In the operation shown in the table, the information string $f(x)$ equal to 11001010 is divided by the cyclic generator polynomial of the shift register network. By simple logic circuitry the shift register contents, namely, the remainder, is added to the message information polynomial $f(x)$ augmented by zeros providing the data block $F(x)$ equal to 110010101010011, reading left to right from higher order to lower order.

TABLE 2

| Input | | | | | | | | |
|---|---|---|---|---|---|---|---|---|
| | 0 | 0 | 0 | 0 | 0 | 0 | 0 | ← (initial state) |
| 1 | 1 | 1 | 1 | 0 | 0 | 1 | 1 | |
| 1 | 0 | 1 | 1 | 1 | 0 | 0 | 1 | |
| 0 | 1 | 1 | 0 | 1 | 1 | 1 | 1 | |
| 0 | 1 | 0 | 0 | 0 | 1 | 0 | 0 | |
| 1 | 1 | 0 | 1 | 0 | 0 | 0 | 1 | |
| 0 | 1 | 0 | 1 | 1 | 0 | 1 | 1 | |
| 1 | 0 | 1 | 0 | 1 | 1 | 0 | 1 | |
| 0 | 1 | 1 | 0 | 0 | 1 | 0 | 1=r(x) | |

I claim:

1. A method for encoding and decoding binary digital data for error detection in an asymmetric data channel comprising:
   encoding the digital data by a cyclic code;
   forming the complement of the cyclic-coded digital data;
   processing the cyclic-coded digital data and its complement in the asymmetric data channel;
   generating a coset of error syndromes for the complemented cyclic-coded digital data;
   comparing bit by bit the corresponding bits of the cyclic-coded digital data and its complement;
   detecting the existence of an error burst in the retrieved data;
   determining the error burst pattern;
   comparing the detected error burst pattern with the respective error syndromes of the cyclic-coded digital data and its complement to determine whether the error burst occurred in the cyclic-coded digital data or its complement; and
   correcting the error burst according to the pattern of the corresponding error syndrome.

2. A method for encoding and decoding binary digital data as set forth in claim 1 wherein said processing step comprises storing the cyclic-coded digital data and its complement and retrieving the cyclic-coded digital data and complement.

3. A method for encoding and decoding as set forth in claim 2 wherein said asymmetric data channel comprises a laser recording unit.

4. A method for encoding and decoding binary digital data as set forth in claim 1 wherein is provided the steps of formating the cyclic-coded digital data into subblocks $D_1, D_2, \ldots D_n$, each subblock having a length in bits equal to the error syndromes, formating the complement into subblocks $\overline{D}_1, \overline{D}_2, \ldots \overline{D}_n$, each subblock having a length in bits equal to the error syndromes, and processing the cyclic-coded digital data and complement in the following order: $D_1, \overline{D}_{n-1}, D_2, \overline{D}_n, D_3, \overline{D}_1, \ldots, D_{n-1}, \overline{D}_{n-3}, D_n, \overline{D}_{n-2}$.

5. A method for encoding and decoding binary digital data as set forth in claim 1 wherein is provided the steps of formating the cyclic-coded digital data and complement into subblocks each having a length in bits equal to the error syndromes, and alternating subblocks from the coded digital data and complement for processing.

6. A method for encoding a binary digit message in an asymmetric data channel comprising:

dividing the binary digit message with a binary digit cyclic code after annexing to the end of the message digits a string of zeros equal in number to one less than the number of places in the cyclic code;

subtracting the remainder generated by said division from the binary digit message and annexed zeros to provide a message data block having digits corresponding to the message and the remainder;

complementing said message data block;

processing said message data block and complement in the asymmetric data channel;

generating by long division of the message data block by the cyclic code a coset of error syndromes comprising the successive remainders of said long division;

generating by long division of said complemented message data block a second coset of error syndromes comprising the remainder of said long division;

comparing bit by bit the corresponding bits of the message data block and its complement;

detecting the existence of an error burst in the retrieved data by coincidence of similar bits in the message data block and its complement and determining the error burst pattern;

comparing the detected error burst pattern with the respective error syndromes of the message data block and its complement to determine whether the error burst occurred in the message data block or its complement; and correcting the error burst according to the pattern of the corresponding error syndrome.

7. A method for encoding and decoding binary digital data as set forth in claim 6 wherein said processing step comprises storing the cyclic-coded digital data and its complement and retrieving the cyclic-coded digital data and complement.

8. A method for encoding and decoding as set forth in claim 7 wherein said asymmetric data channel comprises a laser recording unit.

9. A method for encoding and decoding binary digital data as set forth in claim 6 wherein is provided the steps of formating the cyclic-coded digital data and complement into subblocks each having a length in bits equal to the error syndromes, and alternating subblocks from the coded digital data and complement for processing.

10. A system for encoding and decoding binary digital data for error detection in an asymmetric data channel comprising:

a cyclic code generator for encoding the digital data by a cyclic code;

inverter means for forming the complement of the cyclic-coded digital data;

an asymmetric data channel for processing the cyclic-coded digital data and complement;

first syndrome generator means for generating a coset of error syndromes for the cyclic-coded digital data;

second syndrome generator means for generating a coset of error syndromes for the complemented cyclic-coded digital data;

gating means for bit-by-bit comparison of the corresponding bits of the cyclic-coded digital data and its complement in order to detect the existence of an error burst in the retrieved data and determine the error burst pattern;

means for comparing the detected error burst pattern with the respective error syndromes of the cyclic-coded digital data and its complement to determine whether the error burst occurred in the cyclic-coded digital data or its complement; and complementing means for correcting the error burst according to the pattern of the corresponding error syndrome.

11. A system for encoding a binary digit message in an asymmetric data channel comprising:

a remainder generator for dividing the binary digit message with a binary digit cyclic code after annexing to the end of the message digits a string of zeros equal in number to one less than the number of places in the cyclic code;

logic means for subtracting the remainder generated by said division from the binary digit message and annexed zeros to provide a message data block having digits corresponding to the message and the remainder;

inverter means for complementing said message data block;

an asymmetric data channel for processing said message data block and complement;

first syndrome generator for generating by long division of the message data block by the cyclic code a coset of error syndromes comprising the successive remainders of said long division;

second syndrome generator generating by long division of said complemented message data block a second coset of error syndromes comprising the remainder of said long division;

gating means for bit-by-bit comparison of the corresponding bits of the message data block and its complement in order to detect the existence of an error burst in the retrieved data and determine the error burst pattern;

means for comparing the detected error burst pattern with the respective error syndromes of the message data block and its complement to determine whether the error burst occurred in the message data block or its complement; and complementing means for correcting the error burst according to the pattern of the corresponding error syndrome.

12. A decoder for cyclic-coded binary data stored in true and complemented form in an asymmetric binary data channel comprising:

first syndrome generator means for generating a coset of error syndromes for the cyclic-coded digital data;

second syndrome generator means for generating a coset of error syndromes for the complemented cyclic-coded digital data;

gating means for bit-by-bit comparison of the corresponding bits of the cyclic-coded digital data and its complement in order to detect the existence of an error burst in the retrieved data and determine the error burst pattern; and means for comparing the detected error burst pattern with the respective error syndromes of the cyclic-coded digital data and its complement to determine whether the error burst occurred in the cyclic-coded digital data or its complement.

13. A decoder as set forth in claim 12 wherein is also provided complementing means for correcting the error burst according to the pattern of the corresponding error syndrome.

* * * * *